United States Patent
Nishida

(10) Patent No.: US 6,552,273 B2
(45) Date of Patent: Apr. 22, 2003

(54) BUS BAR MODULE

(75) Inventor: Shiro Nishida, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/945,591

(22) Filed: Sep. 4, 2001

(65) Prior Publication Data

US 2002/0053456 A1 May 9, 2002

(30) Foreign Application Priority Data

Apr. 9, 2000 (JP) ........................................ 2000-267174

(51) Int. Cl.⁷ .............................................. H01B 17/06
(52) U.S. Cl. ............................. 174/149 B; 174/149 R; 174/148; 174/137 R
(58) Field of Search .......................... 174/149 B, 68.2, 174/70 B, 71 B, 72 B, 99 B, 137 A, 155, 156, 137 B, 168; 361/611, 624, 637

(56) References Cited

U.S. PATENT DOCUMENTS

| | | | | |
|---|---|---|---|---|
| 3,346,687 A | * | 10/1967 | Giger, Jr. et al. | 174/68.2 |
| 3,956,574 A | * | 5/1976 | Weimer | 174/117 FF |
| 4,201,435 A | * | 5/1980 | Nakamura et al. | 428/364 |
| 4,929,801 A | * | 5/1990 | Hibbert | 174/16.2 |
| 5,670,743 A | * | 9/1997 | Welch et al. | 174/49 |
| 5,734,125 A | * | 3/1998 | Yasukuni et al. | 174/52.2 |
| 5,854,445 A | * | 12/1998 | Graham et al. | 174/133 B |
| 6,222,127 B1 | * | 4/2001 | Ykema | 174/68.2 |
| 6,320,132 B1 | * | 11/2001 | Ykema et al. | 174/68.2 |

FOREIGN PATENT DOCUMENTS

JP        2000-151149        5/2000

* cited by examiner

Primary Examiner—Dean A. Reichard
Assistant Examiner—Jinhee J Lee
(74) Attorney, Agent, or Firm—Anthony J. Casella; Gerald E. Hespos

(57) ABSTRACT

A bus bar module (10) includes a bus bar (11) made of a metal material integrally molded into an insulating layer (12) made from resin. The bus bar module (10) also includes a distortion absorptive section (15) for absorbing distortion resulting from difference in the thermal expansion coefficient between the bus bar (11) and the insulating layer (12). Thus, the insulating layer (12) can stretch out by a difference in expanded dimension between the insulating layer (12) and the bus bar (11) at thermal expansion. In this way, the distortion resulting from the difference in the thermal expansion coefficient between the bus bar (11) and the insulating layer (12) can be absorbed, and crack occurrence in the insulating layer (12) can be prevented.

2 Claims, 3 Drawing Sheets

BUS BAR MODULE

BACKGROUND OF THE INVENTION

1. Field of the Invention

The present invention relates to a bus bar module integrally composed of bus bar and resin insulating layer.

2. Description of the Related Art

Electric circuits used in an internal combustion engine and in other high temperature environments utilize a bus bar module. A bus bar module has a plurality of bus bars made of a metallic material that has high heat resisting properties (a copper alloy, for example). The bus bars are aligned in parallel, and a plurality of bus bars are integrated by means of insert molding with insulating layers made of resin material (epoxy resin, for example) having heat resisting properties. Thus, the insulating layers insulate the space between the individual bus bars. A bus bar module as described above, is disclosed in the Japanese Unexamined Patent Publication No. 2000-151149.

The thermal expansion coefficient of metal generally differs widely from the thermal expansion coefficient of resin. Thus, there is a fear that repeated cycling from room temperature conditions to high temperature conditions may cause cracks in the resin of a bus bar module that has a metallic bus bar integrated into a resin insulating layer due to the differences of the thermal expansion coefficients.

Accordingly, in view of the aforementioned circumstances, the present invention is originated and the subject of the present invention is to prevent the occurrence of the crack in the resin insulating layer.

SUMMARY OF THE INVENTION

The present invention relates to a bus bar module with a bus bar made of a conductive metallic material and an integrally molded resin insulating layer. The bus bar module further includes a distortion absorptive means for absorbing a distortion that results from a difference in thermal expansion coefficients between the bus bar and insulating layer.

The distortion absorptive means preferably is disposed to divide the insulating layer at an appropriate position along the longitudinal direction of the bus bar.

The bus bar module preferably comprises an insulating layer on the surface of the bus bar.

The distortion absorptive means absorbs the distortion that results from a difference in thermal expansion coefficient between the bus bar and the insulating layer. Accordingly, it is possible to prevent cracks from occurring in the insulating layer.

The thermal expansion coefficient of resin is greater than the thermal expansion coefficient of metal. However, the distortion absorptive means at the divided position of the resin layer effectively enables the resin layer to stretch further by the difference in the thermally expanded dimension between the insulating layer and the bus bar. Hence, there would be no possibilities for a forceful deformation and an excessive stress upon the insulating layer.

The bus bar is partially exposed at the divided position of the insulating layer. However, since the surface of the exposed part is covered with an insulating coating, the bus bar can be maintained in an insulating condition.

DETAILED DESCRIPTION OF THE PREFERRED EMBODIMENT

Figure 1:
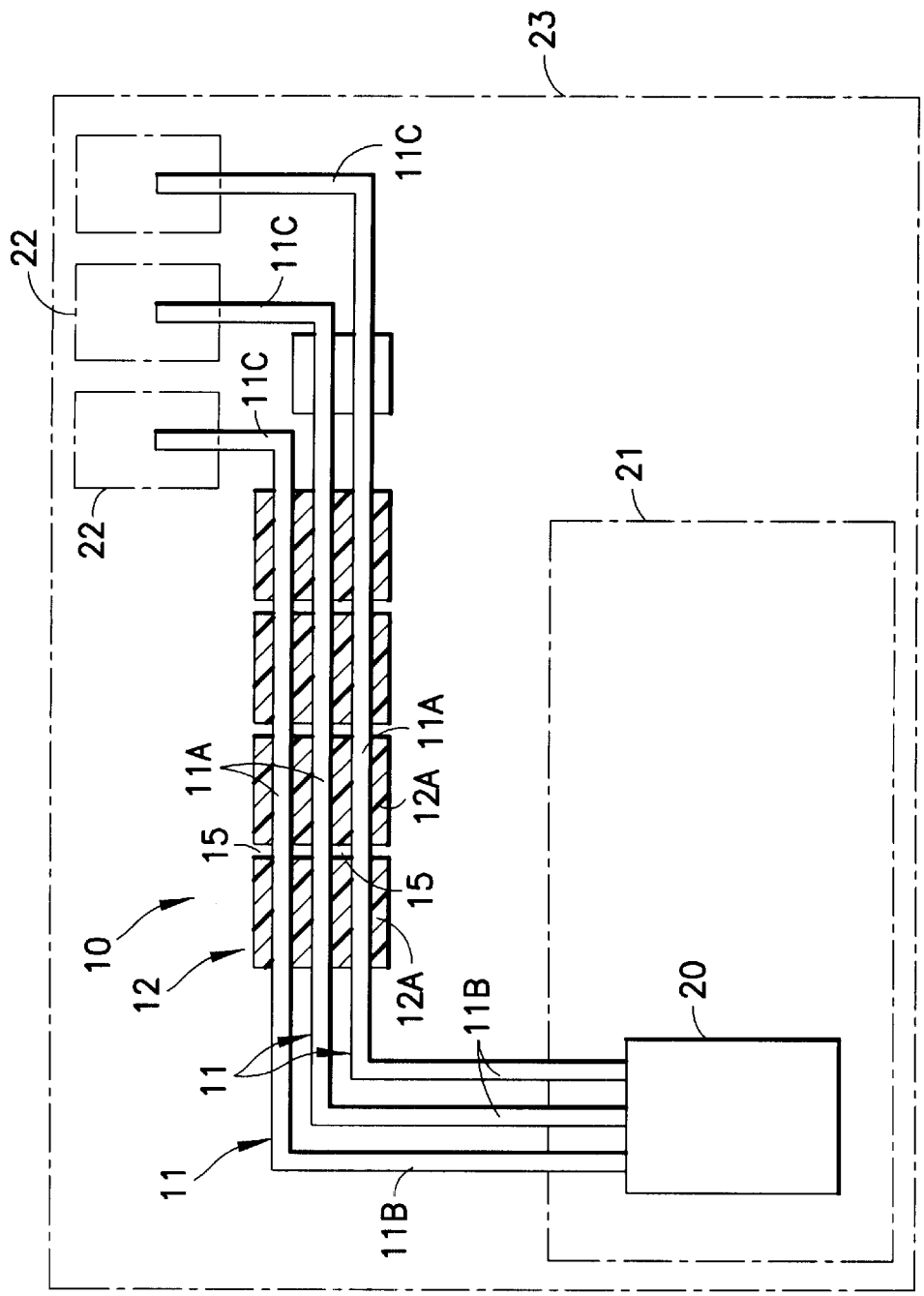
FIG. 1 illustrates a schematic diagram showing a condition in use of a bus bar module in the embodiment 1.
Figure 2:
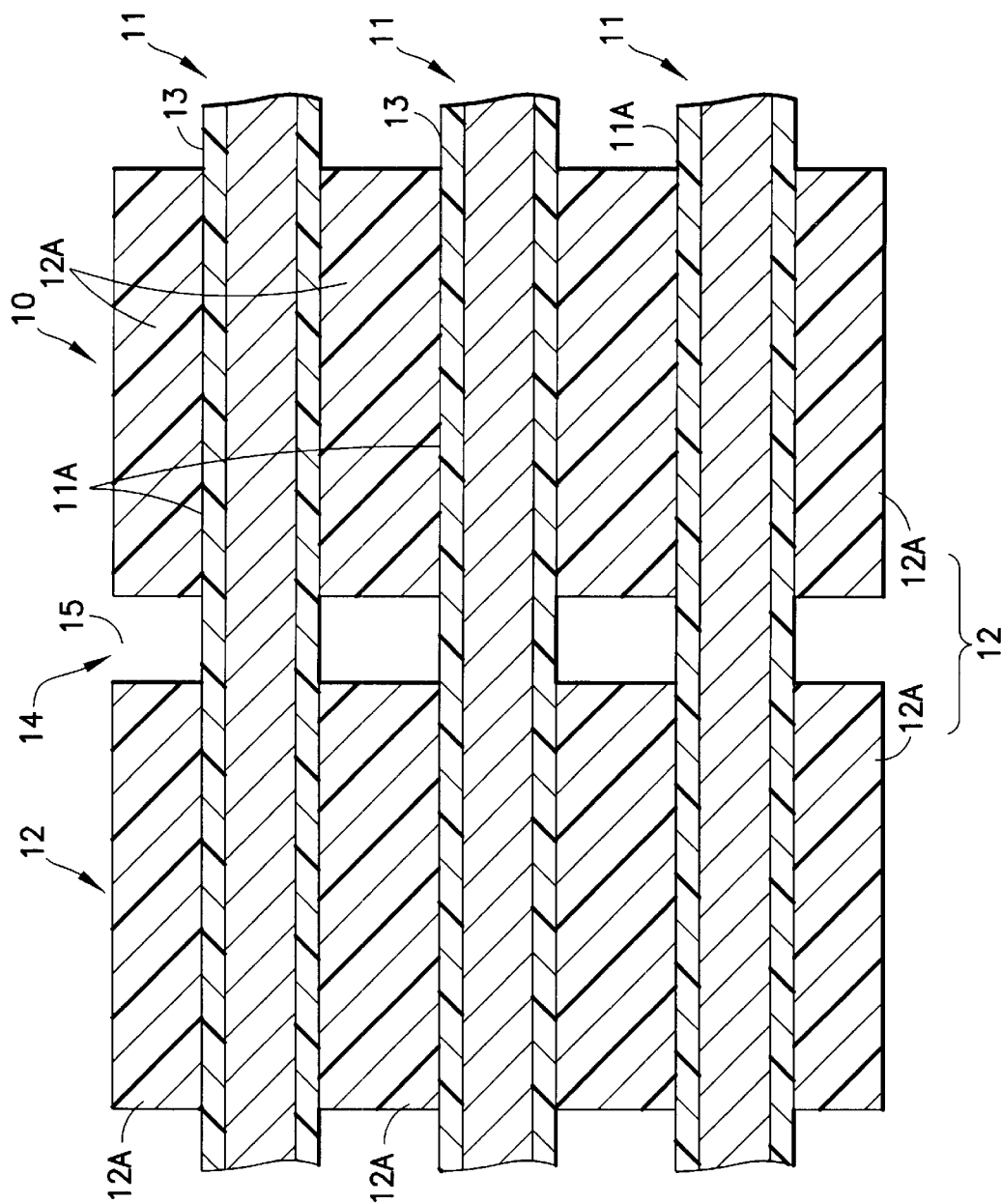
FIG. 2 illustrates a partially enlarged sectional view of a bus bar module.

A bus bar module in accordance with the invention is identified by the number 10 in FIGS. 1 and 2. The bus bar module 10 has a base part made of synthetic resin material having heat resisting properties and oil resisting properties. The base part is connected to a connector 20 that is contained, for example, in a cylinder head 21 of internal combustion engine. Accordingly, a portion of the connector 20 in the inside of the cylinder head 21 is exposed to a high temperature and also is smeared with dispersing oil. The bus bar module 10 extends to the outside of the cylinder head 21, and an electrical wiring system 22 is connected with an individual bus bar 11 at an edge of the bus bar module 10. The bus bar module 10 is arranged in an arrangement space 23 that is close to the cylinder head 21, and accordingly the bus bar module 10 is exposed to a high temperature condition due to heat radiation from the cylinder head 21 during operation of the internal combustion engine and a normal temperature condition during the cooling down that occurs when the internal combustion engine is stopped. These extreme ranges of temperature conditions are repeated alternately.

The bus bar module 10 is integrated in one package by means of integral insert molding. The bus bar module 10 is composed of a plurality of bus bars 11 made up of metallic materials having electrical conductive properties, such as yellow brass and an alloy of heat resisting copper. Three bus bars 11 are shown in the illustrated embodiments, but two or more than three also may be provided. the bus bar module 10 also includes an insulating layer 12 made from a synthetic resin material having heat resisting properties, such as epoxy resin or polyphenylene sulfide (PPS).

Each bus bar 11 comprises a main part 11A that stretches in a straight line. A first linking part 11B extends nearly vertically from a base of the main part 11A and is connected to a connector 20. A second linking part 11C extends nearly vertically from an edge of the main part 11A and is connected to a an electrical wiring system 22. The lengths of the main parts 11A of the individual bus bars 11 are different from each other. Accordingly, the individual linking parts 11B with the connector 20 are mutually parallel, and in addition, the individual linking parts 11C with the electrical wiring system 22 are also mutually parallel.

The main parts 11A of the bus bars 11 are parallel and the insulating layer 12 is between the neighboring main parts 11A. The insulating layer 12 also is arranged outside the outermost main parts 11A. More particularly, the insulating layer 12 and the main part 11A are superimposed alternately. Furthermore, an insulating coating 13 with heat resisting properties, such as enamel coating, is provided on the entire surface of each individual bus bar 11. This insulating coating 13 is provided on the bus bar 11 prior to insert molding, and hence before the bus bar 11 is integrated in one package with the insulating layer 12.

The bus bar module 10 is provided with distortion absorptive means 14 that can absorb distortion attributable to thermal expansion resulting from the difference between the thermal expansion coefficient of the metal, which is the material for the bus bar 11, and the thermal expansion coefficient of the synthetic resin, which is the material for the insulating layer 12. The distortion absorptive means 14 divides the insulating layer 12 at a plural number of appropriate positions along a longitudinal direction of the main part 11A of the bus bar 11. In other words, the insulating layer 12 is partially removed. The distortion absorptive means 14 divides the insulating layer 12 into a plurality of separated insulating layers 12A along the longitudinal direction of the main part 11A, and a dividing space 15 is maintained between the mutual end faces of the separated insulating layers 12A. The dimension in the longitudinal direction of the dividing space 15 is established based on the thermal expansion coefficient of the metal, which is the material for the bus bar 11, the thermal expansion coefficient of the synthetic resin, which is the material for the insulating layer 12, the longitudinal dimension of the individual separated insulating layer 12A, and so on. The established dimension of the dividing space 15 should be greater than the difference in a dimension between the thermally expanded dimension of the bus bar 11 and the thermally expanded dimension of the separated insulating layers 12A when the bus bar module 10 is heated up to the estimated maximum temperature. Additionally, based on the established dimension of the dividing space, the neighboring separated insulating layers 12A are designed not to interfere with each other at thermal expansion. In this case, the surface of the exposed section of the main part 11A in the dividing space 15 between the separated insulating layers 12A is maintained with the insulating coating 13.

The thermal expansion coefficient of synthetic resin is comparatively greater than that of metal. Accordingly, the elongation amount of the separated insulating layers 12A made from synthetic resin is comparatively greater than the elongation amount of the corresponding region in the main part 11A of the bus bar 11 made of metal. However, at the dividing space 15 between the insulating layers 12, the end parts of the separated insulating layers 12A can relatively stretch out to the main part 11A for accommodating the difference of the expansion dimension between the bus bar 11 and the separated insulating layers 12A. Accordingly, it is not possible to give rise to a forceful deformation and an excessive stress upon the separated insulating layer 12A.

The distortion absorptive means 14 can absorb distortion that results from the difference in thermal expansion coefficient between the metal of the bus bar 11 and the thermal expansion coefficient of the synthetic resin of the insulating layer 12. Accordingly, it is possible to prevent cracks from occurring in the insulating layer 12.

Additionally, the insulating coating 13 is provided on the surface of the bus bar 11. As a result, surfaces of the partially exposed sections of the main part 11A in the divided position of the insulating layer 12 are covered by the insulating coating 13. Accordingly, an insulating condition can be maintained.

Figure 3:
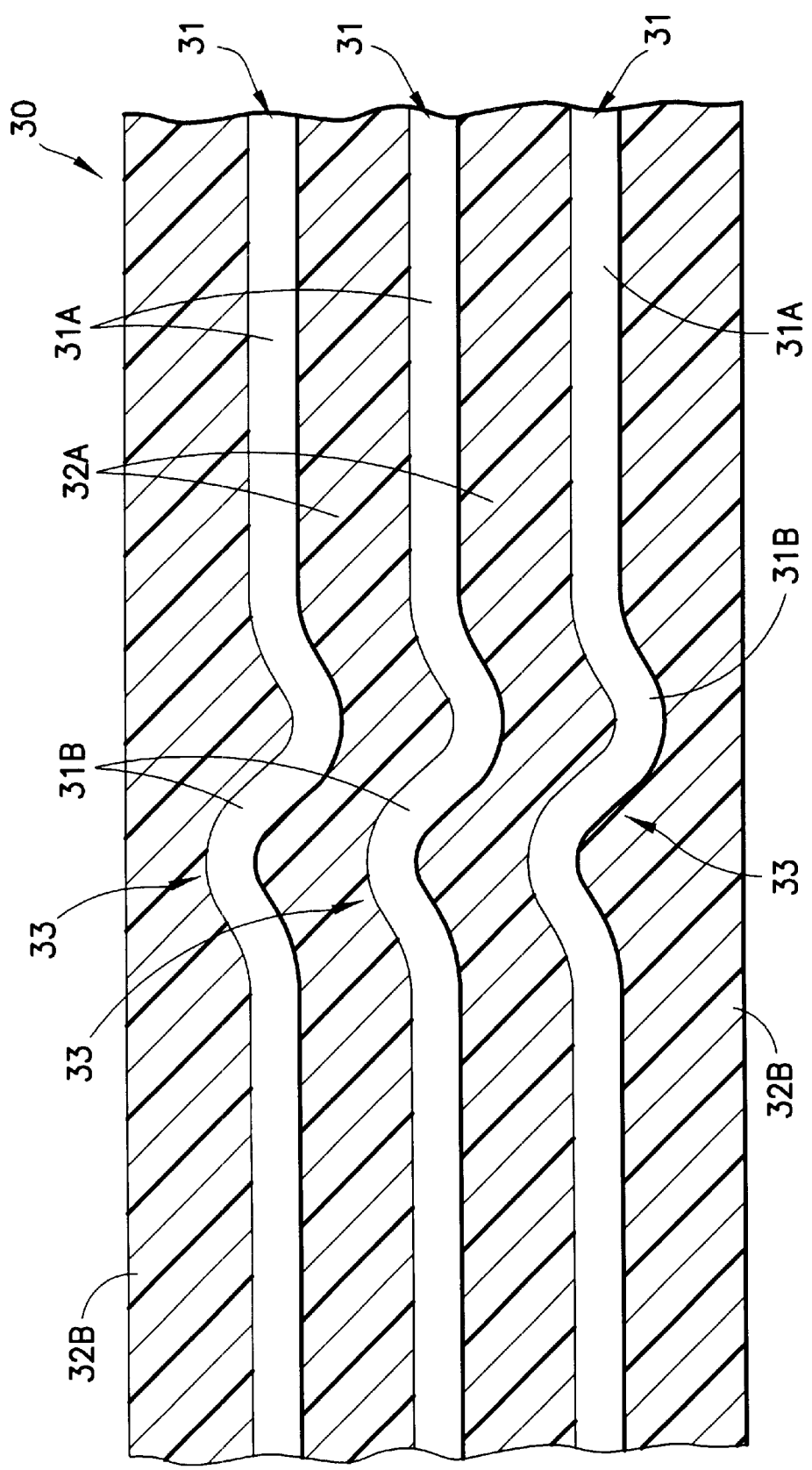
FIG. 3 illustrates a partially enlarged sectional view of a bus bar module in the embodiment 2.

A bus bar module in accordance with a second embodiment of the invention is identified by the numeral 30 in FIG. 3. The bus bar module 30 has a distortion absorptive means 33 is different from the distortion absorptive means of the first embodiment. Since the other composition is identical to the first embodiment, the same numerals are put for the same composition, and the explanation regarding the structure, operation and effect is omitted here.

The distortion absorptive means 33 of the second embodiment comprises a part 31B of the individual main part 31A of each bus bar 31 that is sigmoidally or sinusoidally bent to define a plurality of S-shapes. The sigmoidally bent parts 31B, are disposed in a selected longitudinal position along the bus bars 31, and define curvatures that are the same among the neighboring main parts 31A. Accordingly, the bent parts 31B effectively nest with one another, and the thickness of the insulating layer 32A between the neighboring main parts 31A, as measured in the top-to-bottom direction of FIG. 3, is continuously uniform along the longitudinal direction. In addition, the outside surface of the insulating layer 32B outside the main part 31A is flat and parallel to the longitudinal direction of the bus bar 31. Therefore, the thickness of the region corresponding to the sigmoidally bent part 31B of the insulating layer 32B is uniform in the longitudinal direction.

What is claimed is:

1. A bus bar module comprising an elongate bus bar made of a conductive metallic material and having opposite first and second ends; and a resin insulating layer integrally molded around the bus bar, whereby the resin insulating layer comprises a first section extending from a location in proximity to the first end of the elongate bus bar to a location between the first and second ends of the elongate bus bar, the resin insulating layer further comprising a second section extending from a location in proximity to the second end of the elongate bus bar to a location in proximity to the first section of the resin insulating layer, a distortion absorptive gap being provided between the first and second sections of the resin insulating layer for allowing a distortion to be absorbed that results from a difference in thermal expansion coefficients between the bus bar and the insulating layer.

2. The bus bar module of claim 1, further comprising an insulating coating covering the bus bar.

* * * * *